United States Patent [19]

Chang

[11] Patent Number: 5,838,263
[45] Date of Patent: Nov. 17, 1998

[54] KEYBOARD STRUCTURE OF A PORTABLE COMPUTER

[75] Inventor: Chih-Ching Chang, Taipei, Taiwan

[73] Assignee: Compal Electronics, Inc., Taipei, Taiwan

[21] Appl. No.: 816,246

[22] Filed: Mar. 13, 1997

[51] Int. Cl.⁶ ................................................. G06F 1/16
[52] U.S. Cl. ........................ 341/22; 361/680; 345/169; 400/682
[58] Field of Search ..................... 341/22, 20; 361/680; 345/168, 169; 400/682; 235/145 R

[56] References Cited

U.S. PATENT DOCUMENTS

| | | | |
|---|---|---|---|
| 5,247,285 | 9/1993 | Yokota | 345/169 |
| 5,278,779 | 1/1994 | Conway | 345/169 |
| 5,410,333 | 4/1995 | Conway | 361/680 |
| 5,539,615 | 7/1996 | Sellers | 361/680 |
| 5,596,480 | 1/1997 | Manser | 361/680 |
| 5,615,081 | 3/1997 | Ma | 400/682 |

Primary Examiner—Jeffery Hofsass
Assistant Examiner—Albert K. Wong
Attorney, Agent, or Firm—Pro-Techtor International

[57] ABSTRACT

A keyboard structure of a portable computer, including a keyboard adjusting/retaining device mounted on a main body of the computer and a keyboard device, the keyboard adjusting/supporting device being formed by a support member having two adjacent inclined supporting edges and a bottom edge. The keyboard device is composed of two lateral keyboard divisions. Then assembled, the supporting edges of the keyboard adjusting/supporting device are pivotally connected with the bottom front edges of the lateral keyboard divisions and the bottom edge is pivotally connected with a position near the front edge of the keyboard receptacle division of the main body. When using the computer keyboard to input data, the keyboard adjusting/supporting device is activated to make the lateral keyboard divisions respectively biased and stretched toward two sides and upward inclined forward and outward by a certain angle so as to meet the configuration of human body.

6 Claims, 7 Drawing Sheets

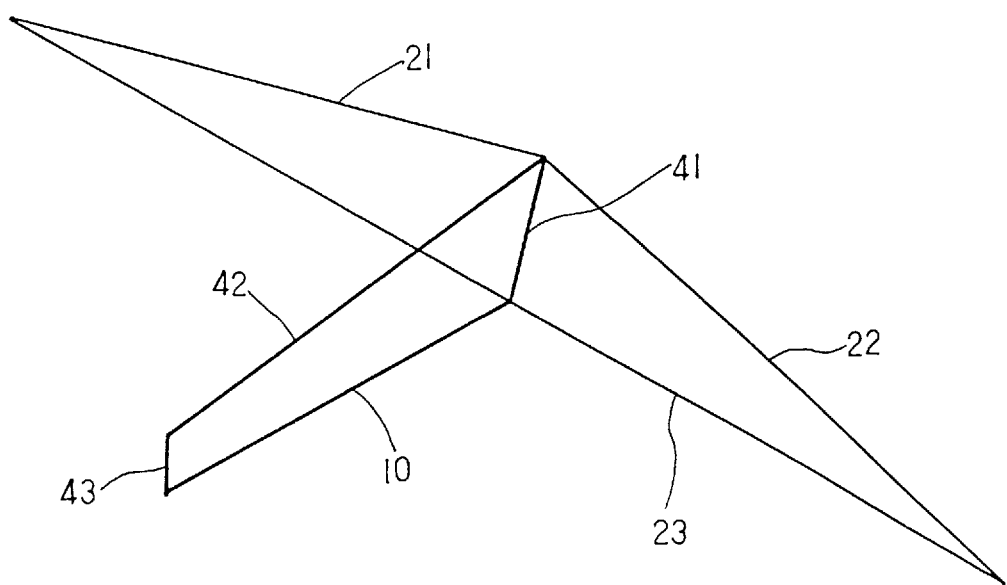
F I G. 4

KEYBOARD STRUCTURE OF A PORTABLE COMPUTER

BACKGROUND OF THE INVENTION

The present invention relates to a keyboard structure of a portable computer, including a keyboard adjusting/retaining device mounted between a main body of the computer and a keyboard device. When using the computer keyboard to input data, by means of the keyboard adjusting/supporting device, the keyboard device is divided into two lateral keyboard divisions which are respectively biased and stretched toward two sides and upward inclined forward and outward by a certain angle so as to meet the configuration of human body.

A conventional keyboard structure of portable computer is horizontally disposed on the main body of the computer. The respective keys are arranged into horizontal and vertical rows. When keying in data with the keyboard, the elbows of the operator are naturally extended outward and the depression directions of the palms and fingers are properly inclined. Therefore, when operating the keyboard of the Portable computer to key in characters or symbols, a restricted and uncomfortable feeling will take place to affect working mood. Moreover, the keyboard of the portable computer is generally narrower than that of an on-desk computer so that it is inconvenient to operate the keyboard of portable computer.

SUMMARY OF THE INVENTION

In order to obviate the above problems, it is a primary object of the present invention to provide a keyboard structure of a portable computer, including a keyboard adjusting/retaining device pivotally disposed between a main body of the computer and a keyboard device. When using the computer keyboard to input data, the keyboard adjusting/supporting device is activated, the keyboard device is divided into two lateral keyboard divisions which are respectively biased and stretched toward two sides and upward inclined by a certain angle so as to meet the configuration of human body. Therefore, an operator can operate the keyboard with a comfortable feeling.

The present invention can be best understood through the following description and accompanying drawings, wherein:

BRIEF DESCRIPTION OF THE DRAWINGS

FIG. 4 shows the structure of the linkage device and keyboard adjusting/supporting device of the present invention;

DETAILED DESCRIPTION OF THE PREFERRED EMBODIMENT

Figure 1:
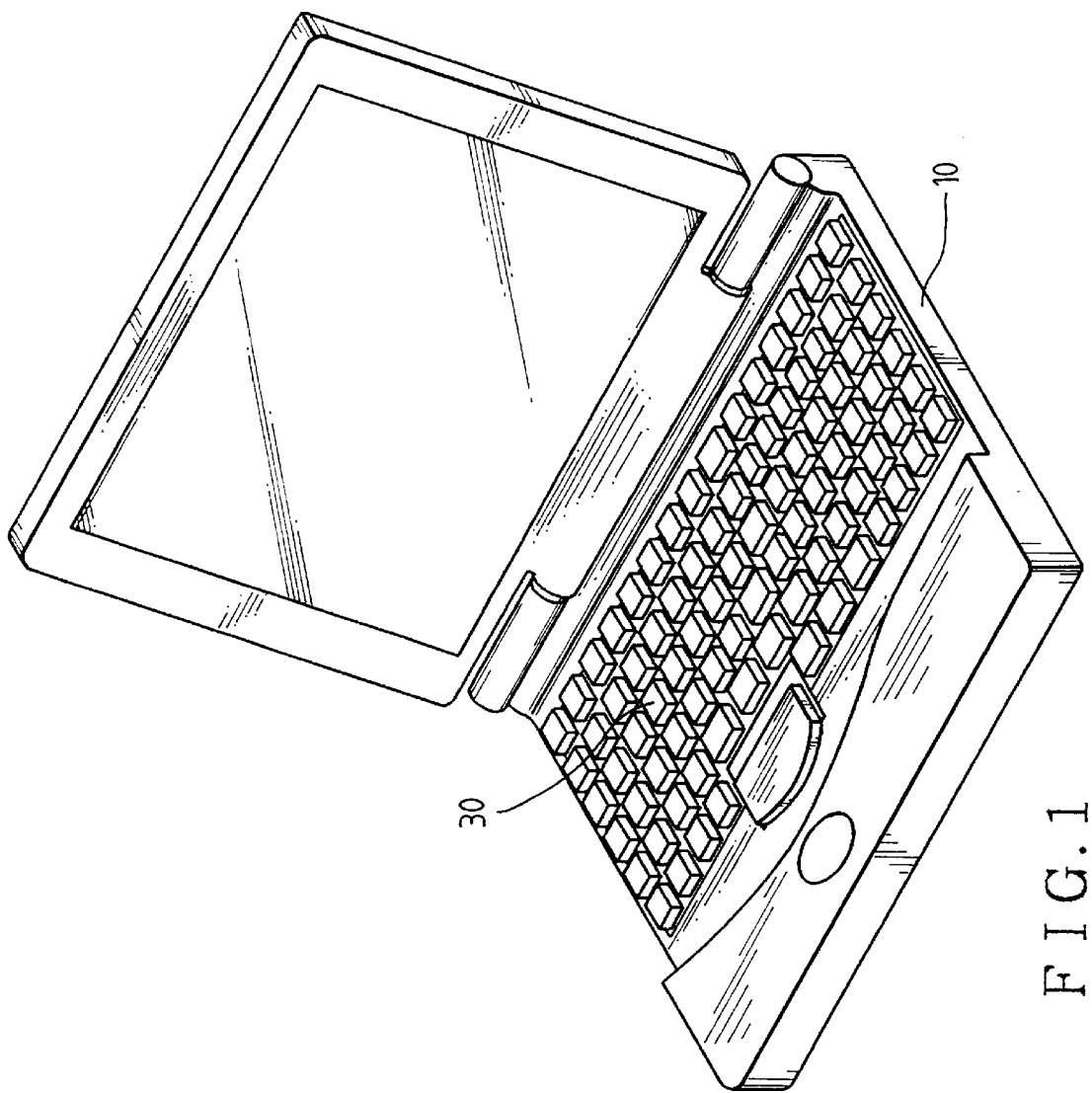
FIG. 1 is a perspective view of the present invention.
Figure 2:
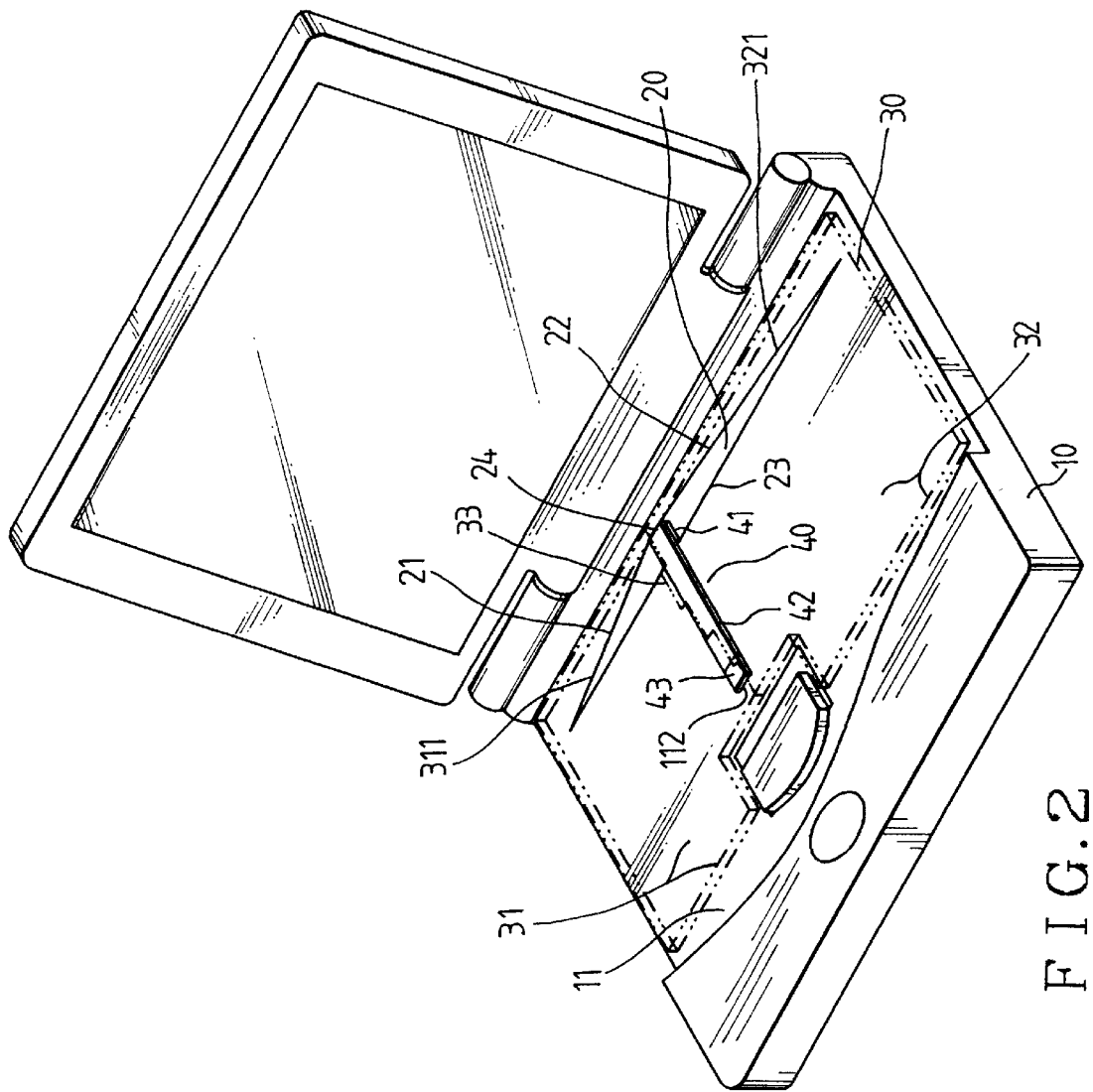
FIG. 2 is a perspective view of the present invention, showing the structure thereof.
Figure 3A:
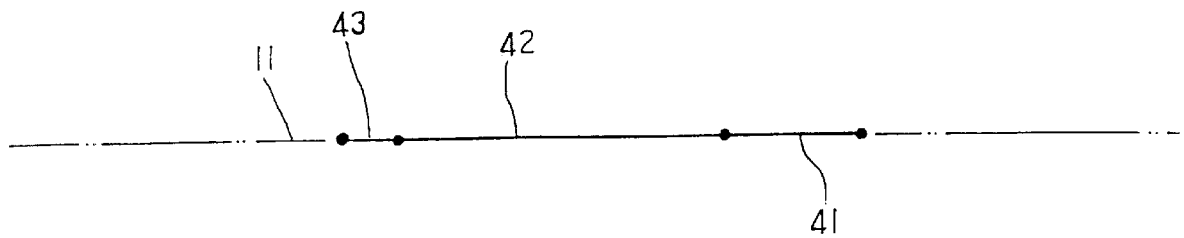
FIG. 3 shows the movement of the linkage device of the present invention.
Figure 3B:
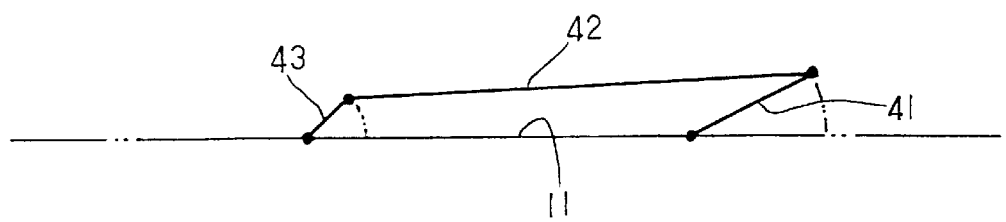
Figure 3C:
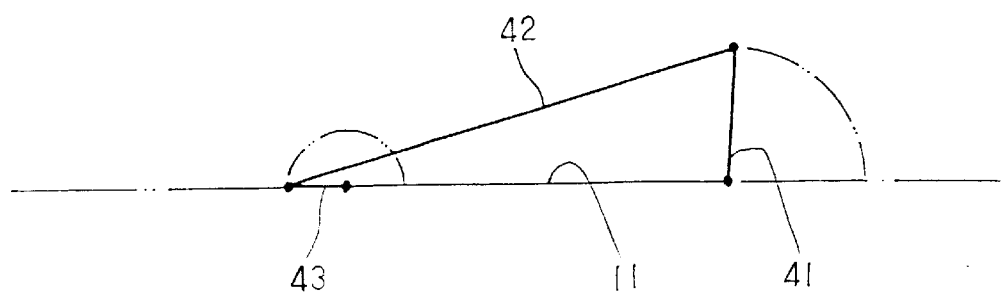
Figure 5:
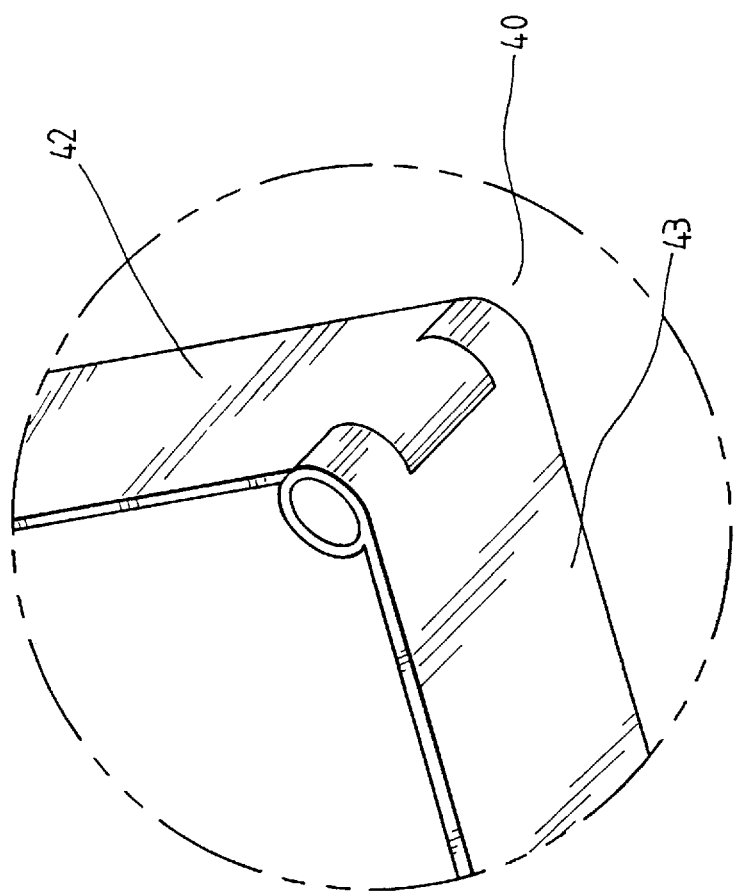
FIG. 5 is a perspective view showing the pivot structure of the Linkage device of the present invention.
Figure 6:
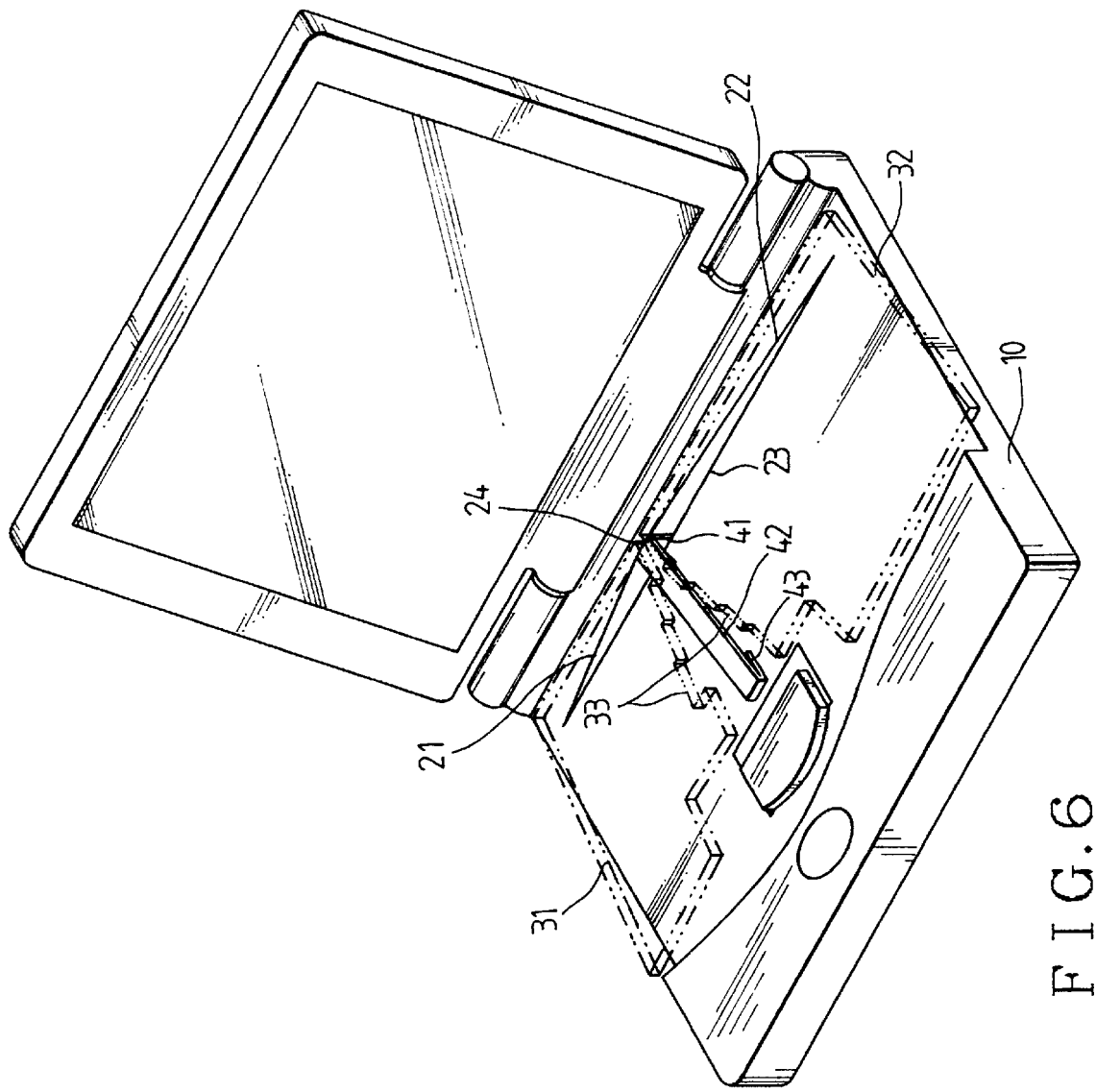
FIG. 6 is a perspective view showing the keyboard device of the present invention in a stretched state.
Figure 7:
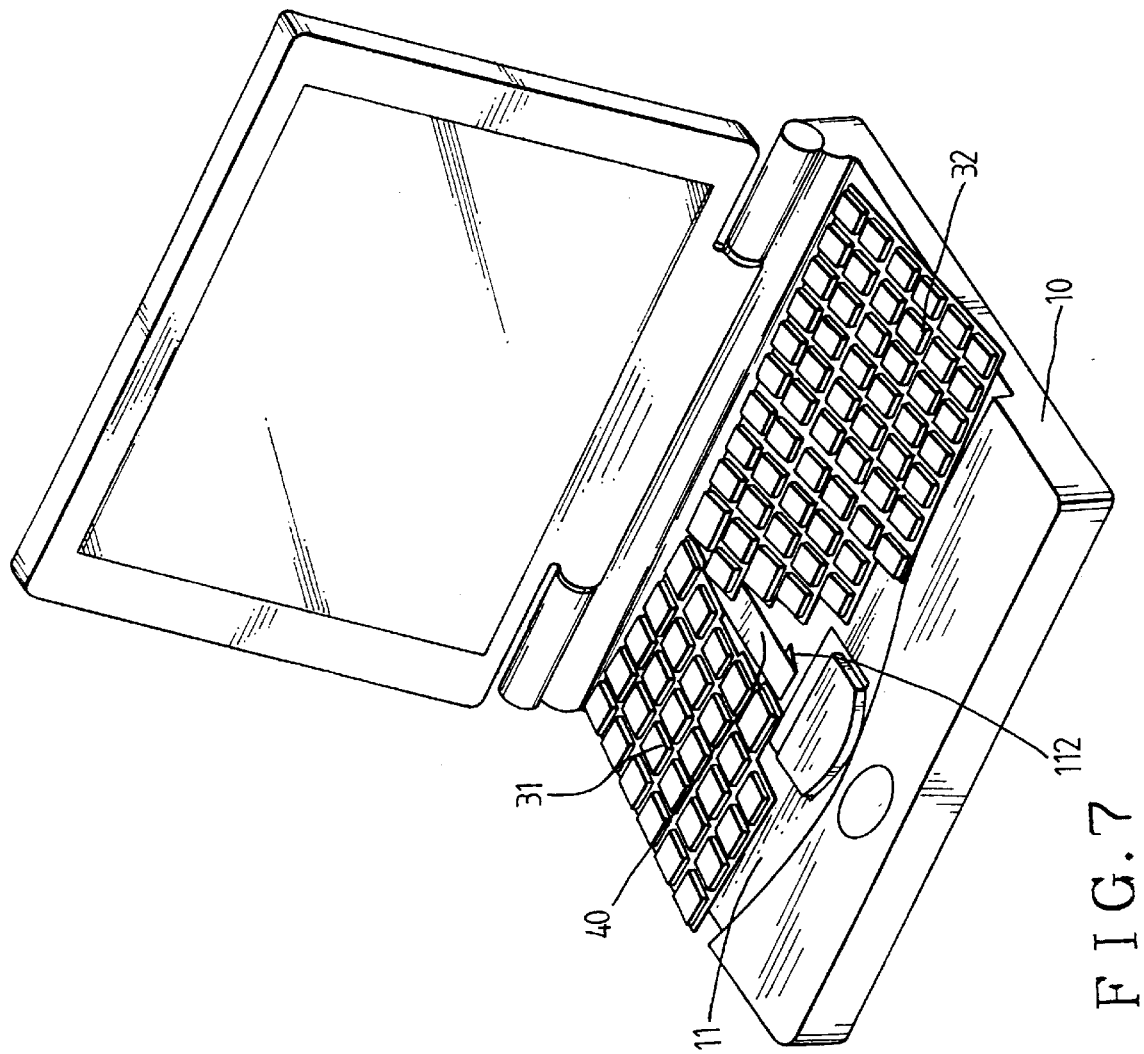
FIG. 7 is a perspective view showing the stretched keyboard device of the present invention.

Please refer to FIGS. 1 to 5. The present invention includes a keyboard adjusting/retaining device 20 mounted on a main body 10 of the computer and a keyboard device 30. The keyboard adjusting/supporting device 20 is formed by a support member having two adjacent inclined supporting edges 21, 22 and a bottom edge 23. The keyboard device 30 is composed of two lateral keyboard divisions 31, 32. When assembled, the supporting edges 21, 22 of the keyboard adjusting/supporting device 20 is assembled in such a manner that the top end of a dividing line 33 of the lateral keyboard divisions 31, 32 coincides with the intersection top point 24 of the adjacent supporting edges 21, 22 and the supporting edges 21, 22 are pivotally connected respectively along inward oblique lines 311, 321 of the bottom face of the lateral keyboard divisions 31, 32. The bottom end 23 of the keyboard adjusting/supporting device 20 is pivotally connected at a position 111 near rear edge of a keyboard receptacle division 11 of the computer main body 10. Therefore, when the center of rear edge of the keyboard device 30 suffers a forward force, the keyboard device 30 by means of the lateral keyboard divisions 31, 32 and the cooperative keyboard adjusting/supporting device 20, the top end of the dividing line 33 is forward and upward shifted through a certain distance and height. The more the top end is moved toward the outward top edge of the keyboard divisions 31, 32, the less the moving distance and height are. By means of the micro-rotation movement about the outward top edge, the keyboard divisions 31, 32 are respectively biased and stretched toward two sides and are upward inclined forward and outward by a certain angle. Therefore, the inclination angle of the keyboard device 30 is just suitable for the angle of an operator to operate the keyboard.

The keyboard adjusting/supporting device 20 is characterized by the top pivot point pivotally connected with the top end of the dividing line 33 of the keyboard device 30 and two lateral bottom pivot points respectively pivotally connected with two lateral rear edges near the front edge of the keyboard receptacle division 11. Therefore, according to the above arrangement, the structural configuration or profile of the keyboard adjusting/supporting device 20 can be still considerably modified.

In order to ensure the accuracy of the operation of the above device, the keyboard adjusting/supporting device 20 is disposed with a linkage device 40 including a first linkage 41, a second linkage 42 and a third linkage 43. Two ends of the first linkage 41 are respectively connected with the center of the bottom edge 23 of the keyboard adjusting/supporting device 20 and the intersection top point 24 of the oblique supporting edges 21, 22. One end of the second linkage 42 is pivotally connected with the latter and the other end of the second linkage 42 is pivotally connected with the free end of the third linkage 43. The other end of the third linkage is pivotally connected with a position 112 near the front edge of the keyboard receptacle division 11. Before the keyboard adjusting/supporting device 20 acts on the keyboard device 30, the respective linkages 41, 42, 43 are attached to or stacked on the keyboard receptacle division 11, permitting the keyboard device 30 to be planely received therein. Reversely, when the keyboard adjusting/supporting device 20 is moved forward to support the keyboard device 30, the linkage device 40 is driven to rotate through different angles. When the third linkage 43 is reversely attached to the casing face of the keyboard receptacle division 11, the first linkage 41 is erected forward and the second linkage 42 provides assistant supporting effect for stabilizing the stretched keyboard device 30.

It should be noted that the above description and accompanying drawings are only used to illustrate one embodiment of the present invention, not intended to limit the scope thereof. Any modification of the embodiment should fall within the scope of the present invention.

What is claimed is:

1. A keyboard structure of a portable computer, comprising a keyboard adjusting/retaining device mounted on a main body of the computer and a keyboard device, the main body being formed with a keyboard receptacle division for receiving the keyboard device, the keyboard adjusting/supporting device being disposed between the keyboard receptacle division and the keyboard device, the keyboard adjusting/supporting device being disposed with a top pivot point pivotally connected with a position near a rear edge of bottom face of the keyboard device and two lateral bottom pivot points respectively pivotally connected with two lateral rear edges near thee front edge of the keyboard receptacle division, the keyboard being substantially divided into two lateral keyboard divisions on the basis of the corresponding position of the top pivot point, whereby when a force is exerted onto the rear edge of the keyboard device toward the operator, by means of the lateral keyboard divisions and the cooperative keyboard adjusting/supporting device, the lateral keyboard divisions are respectively biased and stretched toward two sides and are upward inclined forward and outward by a certain angle.

2. A keyboard structure as claimed in claim 1, wherein the keyboard adjusting/supporting device is formed by a support member having two adjacent inclined supporting edges and a bottom edge.

3. A keyboard structure as claimed in claim 2, wherein the intersection top point of the adjacent supporting edges is pivotally connected with the top pivot point near the rear edge of bottom face of the keyboard device and the oblique supporting edges are pivotally connected respectively along inward oblique lines of the bottom face of the lateral keyboard divisions.

4. A keyboard structure as claimed in claim 1, wherein the keyboard adjusting/supporting device is disposed with a linkage device including a first linkage, a second linkage and a third linkage, two ends of the first linkage being respectively connected with the center of the bottom edge of the keyboard adjusting/supporting device and the intersection top point of the oblique supporting edges, one end of the second linkage being pivotally connected with the latter and the other end of the second linkage being pivotally connected with the free end of the third linkage, the other end of the third linkage being pivotally connected with a position near the front edge of the keyboard receptacle division.

5. A keyboard structure as claimed in claim 2, wherein the keyboard adjusting/supporting device is disposed with a linkage device including a first linkage, a second linkage and a third linkage, two ends of the first linkage being respectively connected with the center of the bottom edge of the keyboard adjusting/supporting device and the intersection top point of the oblique supporting edges, one end of the second linkage being pivotally connected with the latter and the other end of the second linkage being pivotally connected with the free end of the third linkage, the other end of the third linkage being pivotally connected with a position near the front edge of the keyboard receptacle division.

6. A keyboard structure as claimed in claim 3, wherein the keyboard adjusting/supporting device is disposed with a linkage device including a first linkage, a second linkage and a third linkage, two ends of the first linkage being respectively connected with the center of the bottom edge of the keyboard adjusting/supporting device and the intersection top point of the oblique supporting edges, one end of the second linkage being pivotally connected with the latter and the other end of the second linkage being pivotally connected with the free end of the third linkage, the other end of the third linkage being pivotally connected with a position near the front edge of the keyboard receptacle division.

* * * * *